United States Patent [19]

Suzuki et al.

[11] 4,453,210
[45] Jun. 5, 1984

[54] MULTIPROCESSOR INFORMATION PROCESSING SYSTEM HAVING FAULT DETECTION FUNCTION BASED ON PERIODIC SUPERVISION OF UPDATED FAULT SUPERVISING CODES

[75] Inventors: Taihei Suzuki; Kensuke Inoue, both of Yokohama, Japan

[73] Assignee: Hitachi, Ltd., Tokyo, Japan

[21] Appl. No.: 140,619

[22] Filed: Apr. 15, 1980

[30] Foreign Application Priority Data

Apr. 17, 1979 [JP] Japan .................................. 54-46004

[51] Int. Cl.³ .............................................. G06F 11/00
[52] U.S. Cl. ...................................... 364/200; 371/16;
179/175.2 C
[58] Field of Search ......................... 364/200 MS File;
371/16, 71, 57; 179/18 EE, 175.2 C

[56] References Cited

U.S. PATENT DOCUMENTS 3,471,686 10/1969 Connell .............................. 364/200
3,908,099 9/1975 Borbas ........................ 179/18 EE X
4,321,666 3/1982 Tasar .............................. 371/16 X

FOREIGN PATENT DOCUMENTS 52-95944 12/1977 Japan .

OTHER PUBLICATIONS

Toy, W. N., "Fault-Tolerant Design of Local ESS Processors", *Proceedings of the IEEE*, vol. 66, No. 10 (Oct. 1978), pp. 1126-1145.
"No. 2 EAX Type 2A Processor Complex", Rice & Stella, 1976 *National Telecommunications Conference*, Vol. II, pp. 27.2-1 to 27.2-3.

*Primary Examiner*—James D. Thomas
*Assistant Examiner*—David L. Clark
*Attorney, Agent, or Firm*—Antonelli, Terry & Wands

[57] ABSTRACT

A multiprocessor information processing system has an additional function to detect a fault occurring in a processor. A counter is provided for each of a plurality of processors for holding an associated fault supervising code. The code stored in the associated counter is periodically updated by the associated processor while the update status of the code is supervised on a cycle longer than the cycle of the updating period. If a fault occurs in one of the processors, the fault supervising code corresponding to that processor will not be updated. Thus, the faulty processor can be detected by periodically supervising the update status of the fault supervising code. The supervising operation can be carried out by software or hardware.

20 Claims, 7 Drawing Figures

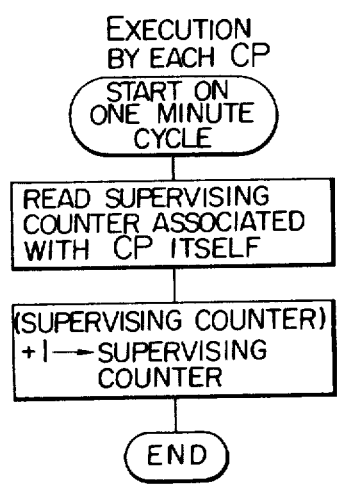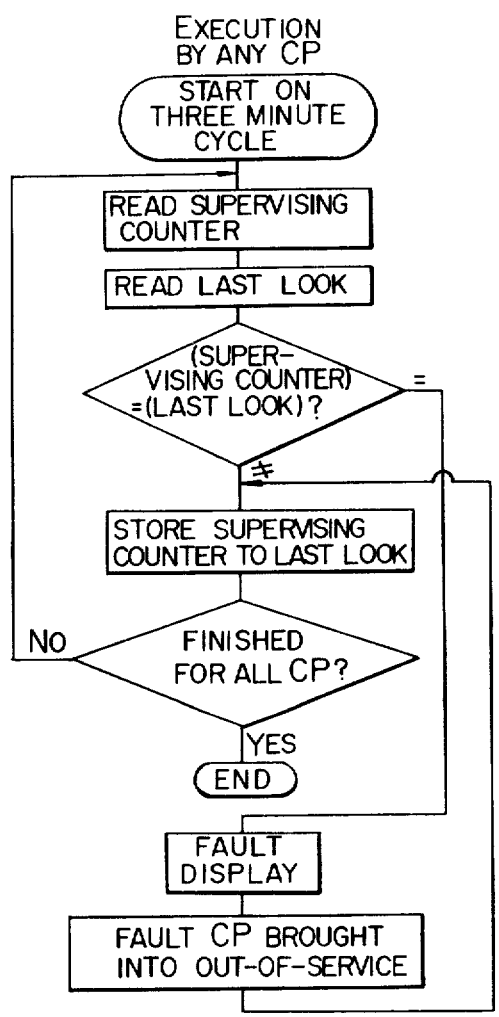

MULTIPROCESSOR INFORMATION PROCESSING SYSTEM HAVING FAULT DETECTION FUNCTION BASED ON PERIODIC SUPERVISION OF UPDATED FAULT SUPERVISING CODES

The present invention relates to means and a method for detecting a fault of a processor in an information processing system, particularly in a multiprocessor type on-line information processing system.

Heretofore, some abnormal conditions arising from the fault of a processor in an information processing system or a remaining bug in the software or the like could not be detected by the detecting means provided in a conventional processor or by the software provided therein such as loop check means for detecting the loss of ability to shift to another program execution, because the execution of the program goes into a closed loop operation by a fault timer for detecting that a clock interruption to a higher priority request has not occured over a predetermined time period or by a bug in the software. In such a case, an on-line process is no longer carried out.

For example, when only program execution including initialization of the fault timer of the processor runs and no entry to other program execution occurs due to a bug in the software, this information is not communicated to a maintenance attendant in a single processor system and the system goes into a system-down condition.

The probability of occurrence of such a problem is usually very low, but once it does occur it will raise a serious problem particularly when the system requires a high reliability and attendant-free maintenance due to its nature, such as a public communication telephone exchange.

In a stored program telephone exchange, in order to detect such an abnormal condition, means is provided for periodically generating a call by means of maintenance hardware and checking whether a response to that call is properly performed. For example, it is checked whether a software controlled proceed-to-send signal is sent back for the seizure signal.

However, in a multiprocessor type information processing system which has been put into practical use, an abnormal condition in one of the processors does not always affect to the entire system because a plurality of processors are included in the system. Therefore, the fault cannot be detected by the method described above and the fault may become a latent fault.

In a duplex processor system, it has been proposed to read out a status word in one processor by the other processor and vice versa (e.g. 1976 National Telecommunications Conference 27.2-1 to 27.2-3 "No. 2 EAX TYPE 2A PROCESSOR COMPLEX"), or to provide a monitoring buffer unit for the two processors so that the two processors alternately access the supervising relay unit for mutual supervision (e.g. Japanese Patent Application Laid-Open No. 95944/77). However, those methods are complex and expensive when the multiprocessor system comprises three or more processors. In addition, in the former method, means for accessing to the companion processor is required and hence a conventional processor cannot be used. In the latter method, an erroneous decision may be made due to an intermittent abnormal condition or disturbance of the cycle period. Furthermore, the control is complex.

As described above, there has been no established means for detecting the abnormal condition before the system goes into a system-down condition.

It is an object of the present invention to provide a method for detecting a fault in a multiprocessor information processing system, particularly in an on-line multiprocessor information processing system, which enables the detection of the abnormal condition before the system goes into a system-down condition.

It is another object of the present invention to provide a method for detecting a fault in a multiprocessor information processing system, which enables a fixed-point reinitiation and communication of a fault indication to a maintenance attendant.

It is another object of the present invention to provide a method for detecting a fault in a multiprocessor information processing system, which is highly flexible regardless of the number of the processors in the system.

It is another object of the present invention to provide an economic and simple method for detecting a fault in a multiprocessor information processing system, which enables the use of general purpose processors without any additional special control means.

It is another object of the present invention to provide a method for detecting a fault in a multiprocessor information processing system, which prevents an erroneous determination due to the pressure of an intermittent abnormal condition or disturbance in the cycle period .

The above and other objects of the present invention will be accomplished by providing supervising counters or supervising memory areas, one for each processor, which are accessible from the respective processors through a common bus and updating codes stored in the supervising counters or supervising memory areas by the respective processors at a first repetition cycle while supervising the update states of the codes associated with the respective processors stored in the supervising counters or the supervising memory areas, on a second repetition cycle longer than the first repetition cycle.

In the drawings;

FIGS. 4a and 4b show flow charts for processing programs in accordance with the first embodiment of the present invention, FIG. 4a being a flow chart for a supervising counter stepping program and FIG. 4b being a flow chart for a processor fault detection program;

Figure 1:
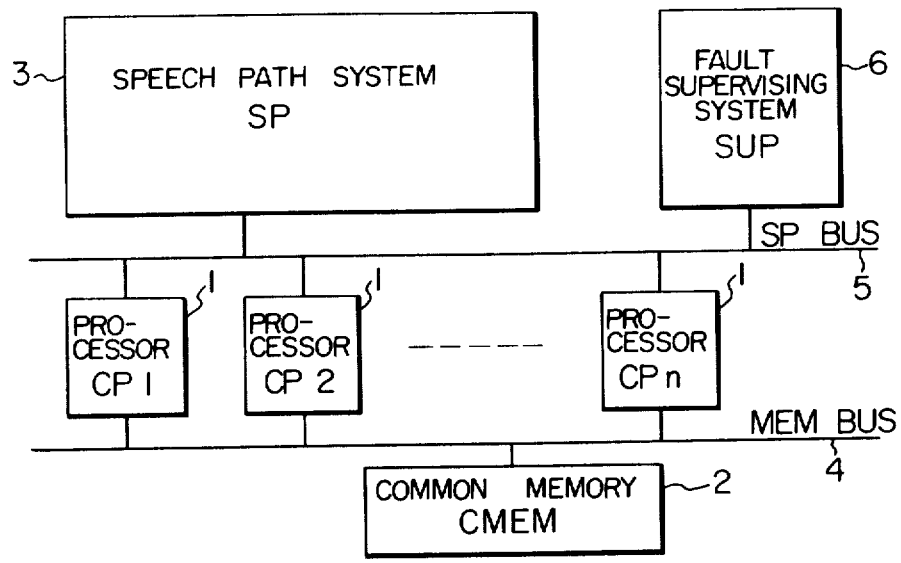
FIG. 1 shows a block diagram for illustrating an embodiment of a method for detecting a fault in a multiprocessor information processing system in accordance with the present invention.

Now referring to the drawings, the embodiments of the present invention will be explained in detail when the present method for detecting a fault in a multiprocessor information processing system is applied to an electronic exchange.

FIG. 1 shows a block diagram of one embodiment of the method for detecting a fault in a multiprocessor information processing system in accordance with the present invention.

In FIG. 1, plural processors (CP1, CP2, ... CPn) are provided for processing information under the control of programs, which are stored in a common memory (CMEM). Numeral 3 denotes a speech path system (SP) for establishing a speech path, numeral 4 denotes a memory bus (MEM BUS) for transferring information between the processors 1 and the common memory 2, numeral 5 denotes a speech path bus (SP BUS) for transferring information between the processor 1 and the speech path system 3, and a numeral 6 denotes a fault supervising system (SUP) having supervising counters or supervising memory areas, one for each of the processors 1 (CP1, CP2, ..., CPn), which are controllable by the respective processors 1 through the speech path bus 5.

Figure 2:
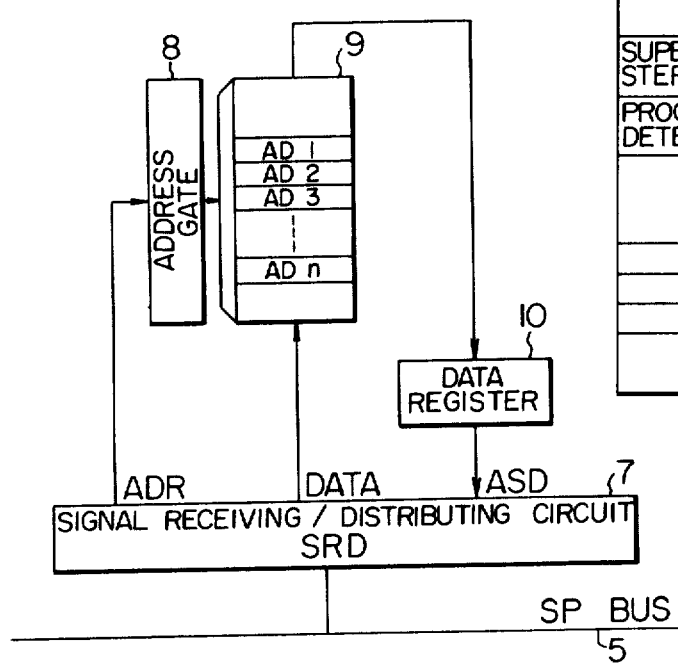
FIG. 2 shows a block diagram illustrating an example of a fault supervising system according to FIG. 1, in accordance with a first embodiment of the present invention.
Figure 3:
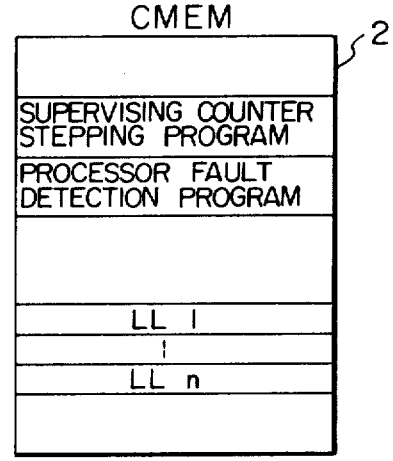
FIG. 3 shows a memory area of a common memory shown in accordance with the first embodiment of the present invention.

FIGS. 2, 3 and 4 illustrate units in accordance with a first embodiment of the present invention, in which FIG. 2 is a block diagram of the fault supervising system 6 shown in FIG. 1, FIG. 3 shows a memory area of the common memory 2 shown in FIG. 1, and FIG. 4 shows flow charts of the processes of the processors 1 shown in FIG. 1, in which FIG. 4a shows a flow chart for a supervising counter stepping program and FIG. 4b shows a flow chart for a processor fault detection program.

In FIG. 2, numeral 7 denotes a signal receiving/distributing circuit (SRD) for receiving and sending signals from and to the speech path bus (SP BUS) 5, numeral 8 denotes an address gate for controlling the transfer of addressing information from the signal receiving/distributing circuit 7, numeral 9 denotes a supervising memory having address areas (AD1-ADn)—e.g. 8-bit address areas—one for each of the n processors (CP1, CP2, ... CPn) and numeral 10 denotes a date register for storing data read out of the supervising memory 9. In FIG. 3, LL1-LLn denote last-look areas for storing last-looks of the associated processors CP1-CPn.

Referring to FIGS. 1 through 4, the control operation for the first embodiment of the present invention will be explained.

Under the control of the supervising counter stepping program which is stored in the common memory 2 and executed on a cycle of one minute as shown in FIGS. 3 and 4a, the processors (CP1-CPn) 1 specify the corresponding addresses AD1-ADn in the supervising memory 9 by address signals (ADR) through the speech path bus 5, the signal receiving/distributing circuit 7 and the address gate 8, and they read out the counts (answer data ASD) associated with their own processors through the data register 10, the signal receiving/distributing circuit 7 and the speech path bus 5. Then, the counts are incremented by one and they are again written into the corresponding address areas in the supervising memory 9 as the counts (data DATA) through the speech path bus 5 and the signal receiving/distributing circuit 7. (See FIG. 4a).

The above program which is executed at the cycle of one minute is a part of a telephone call processing program such as a timing supervising program or a subscriber call detection program. Therefore, if the on-line telephone call processing is not carried out by the occurrence of an abnormal condition, the update (increment) of the supervising memory 9 serving as the fault detection counter is not carried out.

The contents of the addresses AD2-ADn in the supervising memory 9 (which correspond to the processors CP2-CPn, respectively) are read out by a specified processor, e.g. the processor CP1, and the content of the address AD1 (which corresponds to the processor CP1) is read out by the processor CP2, under the control of the processor fault detection program which is stored in the common memory 3 shown in FIG. 3 and executed on a cycle which is at least twice as long as the cycle period of the updating cycle, e.g. on a cycle of three minutes, and they are store in the last-look areas LL1-LLn in the common memory 2 shown in FIG. 3.

Prior to this operation, the counts of the supervising counter read out in the previous cycle have been stored in the last-look areas LL1-LLn of the common memory 2. Accordingly, those counts previously stored are read out of the areas LL1-LLn and they are compared with the counts currently read out of the supervising memory 9, and the processor associated with the address area in the supervising memory 9 having an equality to the previous count is determined to have a fault, and that processor is then stopped or the fault is indicated. (See FIG. 4b).

In the above description, the address areas are provided in the supervising memory 9, one for each of the processors (CP1-CPn) 1 and the contents stored in those areas are incremented. Alternatively, they may be replaced by codes encoded in accordance with a predetermined sequence, or supervising counters may be used instead of the supervising memory areas.

In the illustrated embodiment, the processors CP1 and CP2 are used to read out the contents stored in the supervising memory 9 associated with all of the processors. However, any other processors may be used. For example, if fault occurs in the processor CP1, another processor, e.g. the processor CP3 may be used to read out the content.

Figure 5:
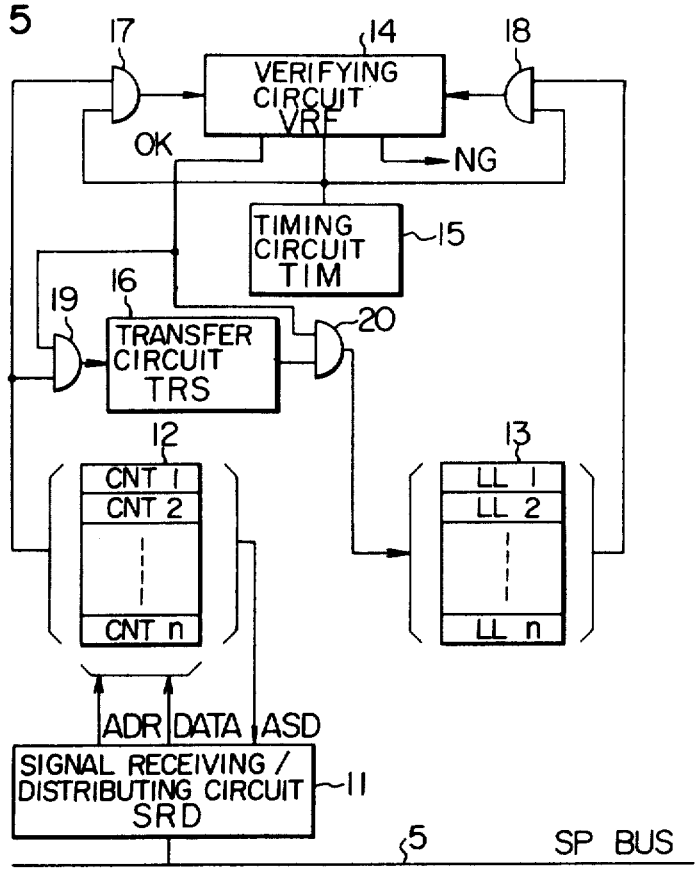
FIG. 5 shows a block diagram of the fault supervising system, in accordance with a second embodiment of the present invention.

Referring now to FIG. 5 which shows another example of the fault supervising system 6 of FIG. 1, a second embodiment of the present invention will be explained.

In FIG. 5, numeral 11 denotes a signal receiving/distributing circuit (SRD) which is similar to the signal receiving/distributing circuit 7 in FIG. 2, numeral 12 denotes a supervising counter group having supervising counters (CNT1-CNTn) corresponding to n processors (CP1-CPn) 1 shown in FIG. 1, respectively, numeral 13 denotes a counter last-look memory which corresponds to the last-look areas in the common memory 2 shown in FIG. 3 and stores the last-looks (LL1-LLn) of the counter 12, numeral 14 denotes a verifying circuit (VRF) for verifying the counters of the counter group 12 and the memory 13, numeral 15 denotes a timing circuit (TIM) for generating timing clocks of three-minute cycle, numeral 16 denotes a memory transfer circuit (TRS) for transferring the contents of the counters of the counter group 12 to the memory 13, and numerals 17, 18, 19 and 20 denote AND gates. In this second embodiment, the fault detection program in the common memory and the last-look areas shown in FIGS. 3 and 4b are not necessary because they are implemented by hardware.

In the second embodiment, like the first embodiment, under the control of the supervising counter stepping program stored in the common memory 2 (see FIGS. 3 and 4a) which is executed on the one-minute cycle, the counters of the supervising counter group 12 (CNT1-CNTn) are read out by the associated processors (CP1-CPn) on the one-minute cycle through the speech path bus 5 and the signal receiving/distributing circuit 11, and they are incremented by one and then again written into the supervising counter group 12.

On the other hand, the respective counts read out of the supervising counter group 12 on the three-minute cycle are stored in the counter last-look memory 13 through the AND gate 19, the memory transfer circuit 16 and the AND gate 20.

The verifying circuit 14 is activated on a cycle which is at least twice as long as the updating cycle of the counter group 12, e.g. on the three-minute cycle, by the timing circuit 15, and it receives the contents of the counters of the supervising counter group 12 and the counter last-look memory 13 for verification, through the AND gates 17 and 18, respectively.

After the verification, the verifying circuit 14 sends a verification completion signal (OK) to open the AND gates 19 and 20 so that the contents of the counters of the supervising counter group 12 are transferred to the counter last-look memory 13 by the memory transfer circuit 16 in preparation for the following verification.

If one or more supervising counters of the supervising counter group 12 are determined to have the equality as a result of verification, fault indication signals (NG) are sent to a maintenance information scanner, not shown, for display by an external fault display, not shown. In this manner, the maintenance attendant or the fault processing processor can identify the faulty processor.

Figure 6:
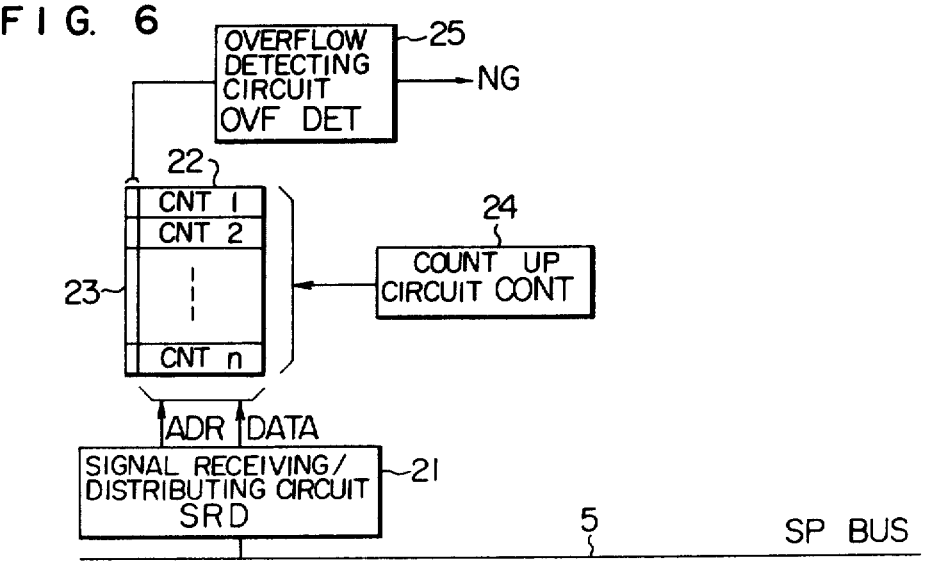
FIG. 6 shows a block diagram of the fault supervising system in accordance with a third embodiment of the present invention.

Referring now to FIG. 6 which shows a further example of the fault supervising system 6 shown in FIG. 1, a third embodiment of the present invention will be explained.

In FIG. 6, numeral 21 denotes a signal receiving/distributing circuit (SRD) which is similar to the signal receiving/distributing circuit 11 shown in FIG. 5, numeral 22 denotes a supervising counter group having supervising counters (CNT1-CNTn) associated with the n processors (CP1-CPn) and associated counter overflow areas 23, respectively, numerals 24 denotes a count-up circuit (CONT) for counting up the supervising counter group 22, and numeral 25 denotes an overflow detection circuit (OVF DET) for detecting the overflow of the supervising counter group 22. The present third embodiment does not need the supervising counter stepping program, the processor fault detection program and the last-look areas in the common memory 2 shown in FIGS. 3 and 4 and also does not need the counter last-look memory 13 and the verifying circuit 14 shown in FIG. 5. Instead, a supervising counter group clear program (not shown) for issuing instructions to periodically clear the counters (CNT1-CNTn) of the supervising counter group 22 to the processors (CP1-CPn) is stored in the common memory 2 shown in FIG. 1.

The contents of the counters (CNT1-CNTn) of the supervising counter group 22 are normally incremented by the count-up circuit 24. When they are incremented 65535 times, for example, they overflow and "1s" are indicated in the overflow areas 23.

On the other hand, under the control of the supervising counter group clear program which is executed on a cycle which is sufficiently shorter than the overflow time period, the processors (CP1-CPn) 1 periodically clear the associated contents of the counters of the supervising counter group 22 to "0". If the counting-up by the count-up circuit 24 is effected at an interval of 3 milliseconds, the overflow occurs in approximately 3 minutes. Accordingly, the supervising counter clear program may be executed on one-minute cycle to clear the supervising counters so that the supervising counter group 22 does not overflow unless there is fault in one or more of the processors (CP1-CPn) 1.

If there is fault in the processor CP1, the associated counter CNT1 in the supervising counter group 22 is not cleared but it overflows and "1" is indicated in the associated overflow area 23. The overflow detection circuit 25 detects the overflow indication "1" and sends a fault indication signal (NG) associated with the processor CP1 to display the fault condition by means of a maintenance scanner or indication lamp.

While the contents of the counters of the supervising counter group 22 are counted up in the illustrated embodiment, it should be understood that they may be counted down. In this case, the areas of the supervising counters (or supervising memory) are reset to initial counts on a cycle which is shorter than a time period required for the contents to reach "0", and if the content reaches "0" it is determined that the associated processor is in fault condition and the fault indication of that processor is given to the external circuit.

As described hereinabove, the present invention can detect the abnormal condition in the multiprocessor type information processing system, which could not be detected by the prior art detecting means until the processing of the fault processor stops and it affects to all of the processors cause a system-down condition. Thus, in accordance with the present invention, prevention measures can be taken before the system goes into the system-down condition. The advantage of the present invention is remarkable particularly in realizing a highly reliable on-line multiprocessor type information processing system.

Furthermore, in accordance with the present invention, no means is required for looking into the interior of the other processor so long as the predetermined circuit is externally provided. Therefore, a general purpose processor such as a microprocessor can be simply incorporated into the multiprocessor system to attain a highly reliable control system.

Furthermore, in accordance with the present invention, an erroneous decision due to an intermittent abnormal condition or disturbance of the cycle can be prevented because the readout or monitor cycle is set to be longer than the count-up cycle.

In addition, a major advantage of the present invention is the realization of a highly flexible system because the system is realized without altering the control and the function by providing a necessary number of supervising counters depending on the number of processors. The present invention is readily applicable to existing multiprocessor systems.

What we claim is:

1. A multiprocessor information processing system having a fault detection function and including at least three processors being respectively connected to a common bus and sharing a load, the system comprising:

storing means connected to said common bus and having a plurality of addressable storage locations each corresponding to a respective one of said processors for storing fault supervising codes in said storage locations, respectively, said storing means being accessible from each of said processors via said common bus;

updating means for controlling each processor to periodically and sequentially access the corresponding storage location in said storing means and update the code stored in said storage location via said common bus in time with a first timing cycle, respectively;

supervising means coupled to said storing means for periodically supervising the update status of said fault supervising codes stored in said storing means in time with a second timing cycle, which is longer than said first timing cycle, to determine the presence of a fault or faults in said processors by detecting no difference between the fault supervising codes in said storing means during a present cycle and a previous cycle of said second timing cycle for a given processor.

2. A multiprocessor information processing system having a fault detection function according to claim 1, wherein said updating means includes a common memory shared by said processors, said common memory including means for storing a program for providing entries to each of said processors in time with said first timing cycle, whereby said processors update the codes stored in said storing means in time with said first timing cycle under the control of said program.

3. A multiprocessor information processing system having a fault detection function according to claim 1, wherein said supervising means includes a common memory shared by said plurality of processors, said common memory including means for storing a program to be executed by at least one of said processors in time with said second timing cycle and having memory areas for storing said fault supervising codes, whereby said one processor reads out said fault supervising codes stored in said storing means for storing the codes in said memory areas, reads out the codes previously stored in said memory areas and compares the former codes with the latter codes, so that a processor associated with the code having an equality between the former code and the latter code is determined to be a faulty processor.

4. A multiprocessor information processing system having a fault detection function according to claim 1, wherein said storing means and said supervising means form part of a supervising system connected to said plurality of processors through a common bus, said supervising means including means for generating timing pulses in time with said second timing cycle, memory means for storing said fault supervising codes which are stored in said storing means, means for transferring said fault supervising codes from said storing means to said memory means in time with said second timing cycle and verifying means for comparing the former codes stored in said memory means at the time of the occurrence of the previous timing pulse with the current codes stored in said storing means each time said timing pulse is generated, whereby a processor associated with a currently-stored code which is equal to the former code as stored in said memory means is determined to be a faulty processor.

5. A multiprocessor information processing system having a fault detection function according to claim 1, wherein said storing means and said supervising means form part of a supervising system connected to said plurality of processors through a common bus, said supervising means including means for updating said codes stored in said storing means in time with a third timing cycle which is shorter than said first timing cycle, said means for supervising said updated codes in time with said second timing cycle comprises means for determining that a processor associated with the code having been updated to a predetermined code is a faulty processor, said updating means including means for periodically resetting the fault supervising codes stored in said storing means to initial codes in time with said first timing cycle.

6. A multiprocessor information processing system having a fault detection function comprising:

means including a plurality of non-synchronously controlled processors for effecting information processing;

storing means connected to each of said plurality of processors for storing a plurality of fault supervising codes, each code designating the operating status of a respective one of said processors;

updating means connected to said processors for controlling each processor to periodically update said codes stored in said storing means in accordance with the current operating status of the processors, respectively, in time with a first timing cycle; and supervising means coupled to said storing means for periodically supervising the update status of said fault supervising codes associated with said processors and stored in said storing means in time with a second timing cycle which is longer than said first timing cycle to determine the presence of a fault in one of said processors when no change in the update status of the fault supervising code for said one processor is detected.

7. A multiprocessor information processing system including a plurality of processors and having a fault detection function comprising:

(a) a supervising system connected to each of said processors through a common bus including means for storing respective fault supervising counts in a plurality of counters each corresponding to a respective one of said processors;

(b) a common memory shared by said plurality of processors and having respective memory areas for storing said fault supervising counts as stored in said storing means, a first program for instructing each of said processors to periodically increment said fault supervising counts in time with a first timing cycle and a second program for instructing at least one of said processors to read out from said storing means said fault supervising counts in time with a second timing cycle which is longer than said first timing cycle to store said fault supervising counts in said memory areas as former counts and compare the former counts previously stored in said memory areas at the time of the previous cycle of said second timing cycle with the current counts in said supervising system read out at the current cycle of said second timing cycle, so that a processor associated with a current count which is equal to the former count is determined to be a faulty processor; and (c) said plurality of processors being controlled by the programs stored in said common memory to access said supervising system through said common bus for processing information.

8. Method for detecting a fault in a multiprocessor information processing system comprising:

(a) a first step of incrementing fault supervising counts in a plurality of counters each corresponding to a respective one of a plurality of processors, each of said counters being accessible by said processors through a common bus, said incrementing being effected under the control of a first program stored in a common memory, said first program providing entries to said processors in time with a first timing cycle;

(b) a second step of reading out said fault supervising counts in said counters under the control of a second program stored in said common memory, said second program being executed in time with a second timing cycle which is longer than said first timing cycle, and storing said counts in memory areas in said common memory, each of said memory areas corresponding to a respective onf of said processors; and (c) a third step of reading out the fault supervising counts previously stored in said memory areas of said common memory during the previous cycle of said second timing cycle and the fault supervising counts on the current cycle stored in said counters, under the control of said second program executed in time with said second timing cycle to compare said previously stored counts with said currently stored counts, whereby a processor associated with a previously stored count which is equal to a currently stored count is determined to be a faulty processor.

9. A multiprocessor information processing system having a fault detection function comprising:

(a) a common memory for storing programs one for each processor, said programs being executed in time with a first timing cycle;

(b) a plurality of processors sharing said common memory for processing data under the control of said programs stored in said common memory; and (c) a fault supervising system accessible by said plurality of processors through a common bus, said fault supervising system including, (i) means provided one for each of said plurality of processors for storing fault supervising codes periodically updated by the respective processors in a predetermined order under the control of the programs stored in said common memory and executed in time with said first timing cycle, and (ii) means for periodically comparing the codes previously stored in said storing means at a first time point with the codes stored in said storing means at a second time point spaced from said first time point by a second timing cycle longer than said first timing cycle, to determine that a processor associated with the former code which is equal to the latter code is a faulty processor.

10. A multiprocessor information processing system having a fault detection function according to claim 9, wherein said fault supervising system includes:

(i) supervising counters or supervising memory areas one for each of said plurality of processors for storing fault supervising codes updated by the respective processors;

(ii) a signal receiving/distributing circuit for addressing said supervising counters or supervising memory areas, writing the updated data and reading out the contents of said counters or said memory areas for effecting the reception and the transmission of the associated signals through said common bus;

(iii) a last-look memory for storing the contents of said supervising counters or supervising memory areas at a first time point;

(iv) a timing circuit for generating timing pulses in accordance with said second timing cycle;

(v) a verifying circuit for reading the contents previously stored in said supervising counters or supervising memories at said second time point and the current contents stored in said last-look memory at said first time point, each time said timing pulse is generated to compare the former contents with the latter contents for providing a fault indication of a faulty processor to an external circuit when there is equality between the previously stored content and the current content, and (vi) a memory transfer circuit for transferring the contents of said supervising counters or supervising memories to said last-look memory upon the completion of the verification of said verifying circuit.

11. A multiprocessing information processing system having a fault detection function comprising:

(a) a common memory for storing programs one for each processor, said programs being executed in time with a first timing cycle;

(b) a plurality of processors connected to a common bus and sharing said common memory for processing data under the control of said programs stored in said common memory; and (c) a fault detection system accessible by said plurality of processors through a common bus, said fault detection system including, (i) means having a plurality of addressable storage locations provided one for each of said plurality of processors for storing fault supervising codes periodically initialized by the respective processors under the control of the programs stored in said common memory and executed in time with said first timing cycle, (ii) means for periodically updating said fault supervising codes stored in said storage locations of said storing means in a predetermined sequence in accordance with a second timing cycle which is shorter than said first timing cycle, and (iii) means for periodically supervising the update status of the fault supervising codes stored in said storage locations of said storing means in accordance with a third timing cycle which is longer than said first timing cycle to determine that a processor associated with a storage location storing a code having been updated to a predetermined code in accordance with said predetermined update sequence is a faulty processor.

12. A multiprocessor information processing system having a fault detection function according to claim 10, wherein said storing means includes supervising counters one for each of said processors or a supervising memory having memory areas one for each of said processors, said updating means includes a count-up circuit connected to said storing means, and said supervising means includes means for detecting an overflow in said supervising counters or said supervising memory beyond a predetermined count.

13. A multiprocessor information processing system having a fault detection function according to claim 11, wherein said storing means includes supervising counters one for each of said processors or a supervising memory having memory areas one for each of said processors, said updating means includes a countdown circuit connected to said storing means, and said supervising means includes means for detecting a logical "0" state of the fault supervising codes stored in said supervising counters or said supervising memory.

14. A fault detection arrangement for a multiprocessor information processing system including a plurality of non-synchronously controlled processors capable of performing a plurality of processing tasks, comprising:
  storage means for storing a respective fault supervising code for each of said processors, said storage means being connected by means of a common bus to said plurality of processors to permit each processor to update its supervising code in time with a first timing cycle in a predetermined order; and
  means connected to said storage means for supervising the updating of said codes stored in said storage means for each processor in accordance with a second timing cycle which is longer than said first timing cycle to monitor said updating and for determining, when the result of said monitoring is indicative of a ceasing of said updating of any one of said codes stored in said storage means, that the processor associated with said one code is faulty.

15. A fault detection arrangement according to claim 14, further comprising a common memory shared by said plurality of processors, said updating means including a first program stored in said common memory for providing entries to said processors in time with said first cycle so that each of said processors accesses said storage means to update its fault supervising code stored therein in accordance with said first program.

16. A fault detection arrangement according to claim 14, in which the arrangement further comprises a common memory shared by said plurality of processors, said supervising and determining means including a second program to be executed by a selected one of said processors in time with said second cycle, said common memory storing said second program and having memory areas for storing respective fault detection codes for said processors, in which said selected processor, in accordance with said second program and in time with said second cycle, reads out said fault supervising codes previously stored in said memory areas of said common memory, compares the current fault detection codes with the previously stored fault detection codes to determine that a processor is or is not faulty according to whether the result of comparison between the current fault detection code and the previously stored fault detection code of the processor indicates equality or inequality, and stored in said memory areas said current fault detection codes read from said storage means, whereby said selected processor serves as said supervising and determining means.

17. A fault detection arrangement according to claim 14, further comprising a supervising circuit connected to said plurality of processors through a common bus, said supervising circuit including said storage means and said supervising and determining means, said supervising and determining means having a circuit for generating timing pulses in accordance time with said second cycle, a memory having memory areas for storing fault detection codes obtained by reading said fault supervising codes from said storage means in time with said second cycle, and a verifying circuit for comparing said fault detection codes stored in said memory with said fault supervising codes stored in said storage means each time said timing pulse is generated, whereby a processor associated with a result of said comparison indicative of equality is determined to be a faulty processor.

18. A fault detection arrangement according to claim 14, further comprising a supervising circuit connected to said plurality of processors through a commun bus, said supervising circuit including said storage means and said supervising and determining means, said supervising and determining means having means for counting up said fault supervising codes stored in said storage means in time with a third cycle which is shorter than said first cycle and means for supervising, in time with said second cycle, said counted up codes to determine that a processor associated with a counted up code having been counted up to a predetermined code is a faulty processor, said means for updating in time with said first cycle being constituted by means for periodically resetting said faulty supervising codes through said processors to their initial codes in time with said first cycle.

19. A multiprocessor information processing system including a plurality of processors connected to a common bus and having a fault detection function comprising:
  (a) a supervising system having counters each for different ones of said processors and each accessible by each of said processors through a common bus;
  (b) a common memory shared by a plurality of processors and having memory areas for storing a first program for instructing said processors to increment their associated counters in time with a first timing cycle and a second program for instructing selected ones of said processors to read out the counts of said counters in time with a second timing cycle which is longer than said first timing cycle to store said counts in said memory areas and compare counts previously stored in said memory areas at the time of the previous cycle in time with said second cycle with the counts in said supervising system read out at the current cycle in time with said second cycle so that a processor associated with a count having equality between the former count and the latter count is determined to be a faulty processor; and
  (c) said plurality of processors having a function of accessing said supervising system through said common bus and incrementing their associated counters in accordance with said first program stored in siad common memory, and having another function of reading the counts of all of said counters through said common bus, storing the read counts in said memory areas of common memory, comparing said counts read from said counters with the counts previously stored in said memory areas and determining that a processor is faulty when the result of said comparison associated with the processor is indicative of equality in accordance with said second program stored in said common memory.

20. Method for detecting fault in a multiprocessor information processing system comprising:
  (a) a first step of incrementing the counts of counters provided one of each of a plurality of processors in a supervising system and accessible by said processors through a common bus, in accordance with a first program stored in a common memory, said first program providing entries to said processors in time with a first timing cycle;

(b) a second step of reading out the counts of all of said counters associated with said plurality of processors and storing said read counts in memory areas of said common memory, in accordance with a second program stored in said common memory, said second program being executed in time with a second timing cycle which is longer than said first timing cycle; and (c) a third step of reading out the counts previously stored in said memory areas of said common memory at the time of the previous cycle on said second cycle and the counts stored in said supervising system at the current cycle on the second cycle, comparing said former counts with said latter counts, and determining a processor associated with a result of said comparison indicative of equality to be a faulty processor, in accordance with said second program executed in time with said second timing cycle.

* * * * *